United States Patent
Sandelis et al.

(10) Patent No.: US 9,599,020 B2
(45) Date of Patent: Mar. 21, 2017

(54) TURBINE NOZZLE GUIDE VANE ASSEMBLY IN A TURBOMACHINE

(75) Inventors: Denis Jean Maurice Sandelis, Nangis (FR); Didier Hippolyte Hernandez, Quiers (FR)

(73) Assignee: SNECMA, Paris (FR)

( * ) Notice: Subject to any disclaimer, the term of this patent is extended or adjusted under 35 U.S.C. 154(b) by 626 days.

(21) Appl. No.: 14/115,980

(22) PCT Filed: May 4, 2012

(86) PCT No.: PCT/FR2012/051000
§ 371 (c)(1),
(2), (4) Date: Jan. 2, 2014

(87) PCT Pub. No.: WO2012/153049
PCT Pub. Date: Nov. 15, 2012

(65) Prior Publication Data
US 2014/0116065 A1      May 1, 2014

(30) Foreign Application Priority Data
May 6, 2011   (FR) ..................................... 11 53928

(51) Int. Cl.
*F01D 9/04* (2006.01)
*F02C 7/12* (2006.01)
(Continued)

(52) U.S. Cl.
CPC ................ *F02C 7/12* (2013.01); *F01D 5/186* (2013.01); *F01D 5/30* (2013.01); *F01D 9/023* (2013.01);
(Continued)

(58) Field of Classification Search
CPC .......... F01D 5/186; F01D 5/187; F01D 9/023; F01D 9/041; F01D 25/12; F05D 2240/81; F05D 2260/201; F05D 2260/202
See application file for complete search history.

(56) References Cited

U.S. PATENT DOCUMENTS 4,040,767 A * 8/1977 Dierberger .............. F01D 5/182
  415/115
4,353,679 A * 10/1982 Hauser .................... F01D 5/189
  165/47

(Continued)

FOREIGN PATENT DOCUMENTS

| DE | 10 2005 024696 | 1/2006 |
| EP | 1 522 679 | 4/2005 |
| GB | 2 455 899 | 7/2009 |

OTHER PUBLICATIONS

International Search Report Issued Jul. 4, 2012 in PCT/FR12/051000 Filed May 4, 2012.
(Continued)

*Primary Examiner* — Ninh H Nguyen
(74) *Attorney, Agent, or Firm* — Oblon, McClelland, Maier & Neustadt, L.L.P.

(57) ABSTRACT

A sectorized nozzle for a turbine engine turbine including an inner sectorized annular platform and an outer sectorized annular platform connected together by radial airfoils, at least one of the platforms including a plurality of orifices for passing air in a neighborhood of its upstream end, the orifices being distributed over the circumference of the platform and opening out at their ends remote from the airfoils into a circumferential annular cavity of the sector of the platform, which cavity is closed by a metal sheet fastened to the platform sector and pierced by orifices for feeding cooling air.

7 Claims, 2 Drawing Sheets

(51) Int. Cl.
*F01D 9/02* (2006.01)
*F01D 5/18* (2006.01)
*F01D 5/30* (2006.01)

(52) U.S. Cl.
CPC ........ *F01D 9/041* (2013.01); *F05B 2240/201* (2013.01); *F05D 2240/81* (2013.01); *F05D 2260/201* (2013.01); *F05D 2260/202* (2013.01); *Y02T 50/676* (2013.01)

(56) References Cited

U.S. PATENT DOCUMENTS

| | | | | |
|---|---|---|---|---|
| 6,120,249 | A * | 9/2000 | Hultgren | F01D 5/187 |
| | | | | 416/193 A |
| 8,118,554 | B1 * | 2/2012 | Liang | F01D 9/041 |
| | | | | 416/97 R |
| 8,851,845 | B2 * | 10/2014 | Brittingham | F01D 5/186 |
| | | | | 416/193 A |
| 2005/0079060 | A1 | 4/2005 | MacManus | |
| 2005/0281663 | A1 | 12/2005 | Trindade et al. | |
| 2010/0047056 | A1 | 2/2010 | Lee et al. | |
| 2010/0129196 | A1 | 5/2010 | Johnston et al. | |
| 2012/0177479 | A1 * | 7/2012 | Azad | F01D 5/187 |
| | | | | 415/115 |

OTHER PUBLICATIONS

French Search Report Issued Nov. 29, 2011 in FR 11 53928 Filed May 6, 2011.

\* cited by examiner

TURBINE NOZZLE GUIDE VANE ASSEMBLY IN A TURBOMACHINE

BACKGROUND OF THE INVENTION

Field of the Invention

The invention relates to a turbine nozzle in a turbine engine such as a turboprop or a turbojet.

Description of the Related Art

Conventionally, a turbine engine comprises from upstream to downstream a compressor feeding air to a combustion chamber, which ejects hot gas into a high-pressure turbine. The high-pressure turbine has at least one nozzle followed by a turbine wheel. The nozzle is sectorized and comprises inner and outer platforms between which there extend substantially radial airfoils. The nozzle serves to provide proper guidance of the hot gas leaving the combustion chamber towards the wheel.

In operation, it is observed that the temperature of the hot gas from the combustion chamber is not uniform circumferentially, thereby giving rise to hot points being formed on the inlet nozzle of the high-pressure turbine. In order to remedy that difficulty, it is known to form through orifices in the upstream neighborhood of the inner and outer platforms of the inlet nozzle, these orifices being distributed around the circumference of each platform and enabling air that has passed around the combustion chamber to be reintroduced into the high-pressure turbine. These streams of air serve to cool the upstream ends of the inner and outer platforms and to make the nozzle inlet temperature more uniform circumferentially.

Nevertheless, that type of technology is not satisfactory since the air passes through the inner and outer platforms at relatively high speed, which leads to the air penetrating radially a long way between the inner and outer platforms of the nozzle. As a result, this cooling air becomes mixed very quickly with the hot gas from the combustion chamber, and it can no longer provide good cooling of the inner and outer platforms.

BRIEF SUMMARY OF THE INVENTION

A particular object of the invention is to provide a solution to this problem that is simple, effective, and inexpensive.

To this end, the invention provides a sectorized nozzle for a turbine engine turbine comprising an inner sectorized annular platform and an outer sectorized annular platform connected together by substantially radial airfoils, at least one of the platforms including a plurality of through orifices for passing air in the neighborhood of its upstream end, the orifices being distributed over the circumference of said platform, the nozzle being characterized in that the air-passing orifices for passing air in each sector of a platform open out at their ends remote from the airfoils into a circumferential annular cavity of the platform sector, the cavity being closed and having cooling air feed orifices that are offset tangentially in a staggered configuration relative to the orifices in the platform.

Forming a closed annular cavity in each of the platform sectors makes it possible to reduce the speed of the cooling air leaving the orifices of the platform. Thus, the cooling air does not penetrate so far into the inside of the annular passage defined between the inner and outer annular platforms and it flows closer to the face of the platform that is situated inside the nozzle.

Positioning orifices in the annular cavity in the circumferential direction in a configuration that is staggered relative to the orifices of the platform enables the air that enters via the orifices in the cavity to cool the platform by air impact. This serves to further reduce the speed of the air penetrating into the nozzle so that it flows along the faces of the platforms inside the nozzle.

The platform of a nozzle of the invention is thus better cooled and the temperature of the nozzle is also made more uniform circumferentially compared with a prior art nozzle.

According to another characteristic of the invention, the orifices of the platform open out beside the airfoils upstream from the leading edges of the airfoils, thus making it possible to guarantee circumferentially uniform cooling at the junctions between the platform and the leading edges of the airfoils.

According to yet another characteristic of the invention, the orifices in the platform and in the annular cavity of each nozzle sector are regularly spaced apart from one another so as to ensure that the reintroduction of air between the inner and outer platforms is circumferentially as uniform as possible.

In a particular configuration of the invention, the axes of the orifices in the platform and in the cavity of each nozzle sector lie substantially in a common plane perpendicular to the longitudinal axis of the nozzle.

According to another characteristic of the invention, the number of orifices in the platform of each nozzle sector is equal to the number of orifices in the cavity of the nozzle sector and the orifices in the platform of each nozzle sector are of a diameter identical to the diameter of the orifices in the cavity of the sector, thereby enabling head losses to be distributed identically over the orifices in the platform and the orifices in the cavity.

The cavity may be formed by an annular groove arranged in the thickness of the platform of each nozzle sector and closed by a metal sheet including the above-mentioned air feed orifices.

The sheet may be fastened by brazing or welding on two cylindrical bearing surfaces of the platform of each nozzle sector, which surfaces are situated respectively upstream and downstream relative to the cavity. These cylindrical bearing surfaces may be made by machining.

In a particular embodiment of the invention, the platform of each nozzle sector includes a radial wall for fastening sealing means at its upstream end, the cavity being situated downstream from said radial wall.

The invention also provides a turbine engine, such as an airplane turboprop or turbojet, characterized in that it includes a turbine nozzle as described above, arranged at the outlet from an annular combustion chamber.

BRIEF DESCRIPTION OF THE SEVERAL VIEWS OF THE DRAWINGS

Other advantages and characteristics of the invention appear on reading the following description made by way of non-limiting example and with reference to the accompanying drawings, in which.

DETAILED DESCRIPTION OF THE INVENTION

Figure 1:
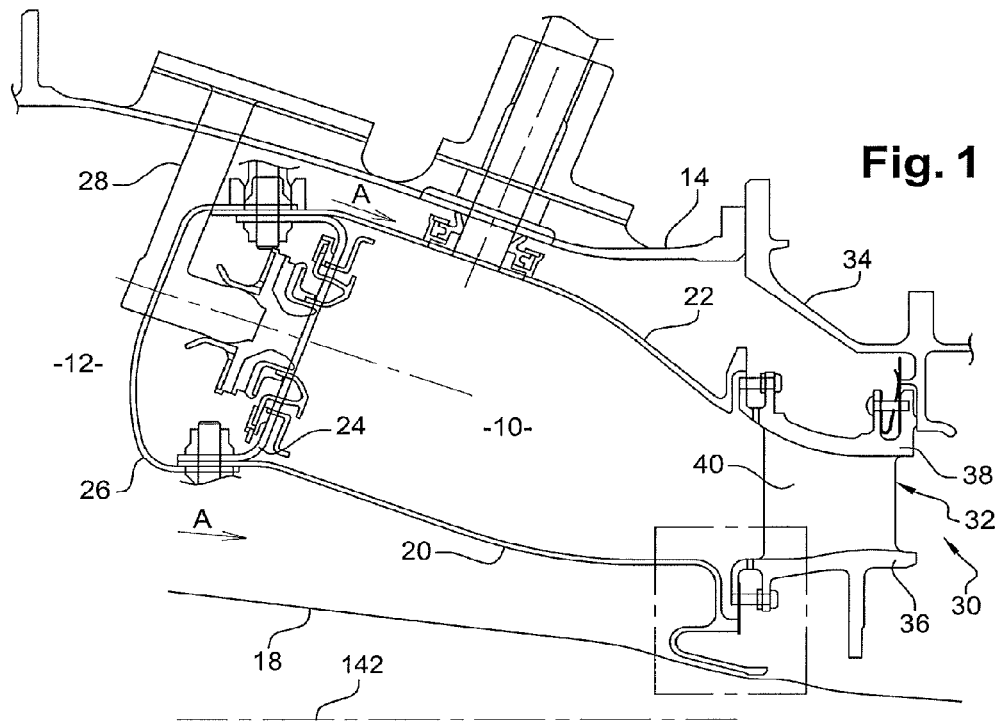
FIG. 1 is a diagrammatic axial section view of a combustion chamber and of the first nozzle of a prior art high-pressure turbine.

Reference is made initially to FIG. 1, which shows a prior art annular combustion chamber 10 in which an upstream high pressure compressor (not shown) feeds air under pressure into an annular space 12 defined between two coaxial casings, a radially outer casing 14 and a radially inner casing 18, which casings contain the combustion chamber 10.

The combustion chamber 10 has two coaxial walls forming inner and outer bodies of revolution 20 and 22, and an upstream annular chamber end wall 24 having an annular fairing 26 fastened thereto and extending upstream.

The annular fairing 26 and the annular chamber end wall 24 have a plurality of openings for passing air and for mounting injectors 28 that are fastened externally onto the outer casing 14.

The outlet from the combustion chamber 10 leads to a high-pressure turbine 30 having at least one nozzle of stationary vanes and at least one rotor wheel of blades. In FIG. 1, only the inlet nozzle 32 of the high-pressure turbine is shown. This nozzle 32 is fastened to an outer casing 34 of the turbine, which is fastened in turn at its upstream end to the downstream end of the outer casing 14 of the combustion chamber 10. The nozzle 32 has inner and outer annular platforms 36 and 38 extending one inside the other and connected together by substantially radial airfoils 40. These inner and outer platforms 36 and 38 thus define between them an annular passage for the flow of burnt gas coming from the combustion chamber 10.

The nozzle 32 is sectorized and is made up of sectors arranged one beside another around a circumference centered on the axis of revolution 142 of the combustion chamber 10.

The downstream ends of the inner and outer cylindrical walls 20 and 22 of the chamber are in alignment and they are connected by sealing means to the upstream ends of the sectors of the inner and outer platforms 36 and 38 of the nozzle.

Figure 1A:
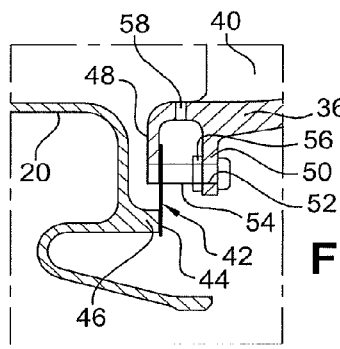
FIG. 1A is a diagrammatic view on a larger scale of the zone in a chain-dotted box in FIG. 1.

FIG. 1A is a view on a larger scale of the inner sealing means, which means are similar to the outer sealing means. These sealing means comprise blades 42 that are arranged circumferentially beside one another around the axis of revolution 142 of the combustion chamber 10, and having joint covers (not shown) mounted thereon. Each blade 42 is formed by a plane plate in a circumferential orientation that extends substantially upstream and inwards in the mounted position. It is fastened by rivets in its middle portion to a nozzle sector and it bears via its inner peripheral edge 44 against a radial face of a cylindrical rim 46 at the downstream end of the inner wall 20.

At its upstream end, the inner platform 36 of the nozzle sector has a radial wall 48 and a plurality of radial tabs 50 that are spaced apart axially downstream relative to the radial wall and that are regularly distributed around the circumference of the inner platform 36. The radial tabs 50 have respective orifices 52 for passing rivets 54 with upstream ends that pass through the blades 42 and that are housed in notches in the radially inner periphery of the radial wall 48. In this way, the blades 42 are fastened to the radial wall 48.

The blades 42 are mounted between the radial wall and the radial tabs and they bear against the downstream radial face of the radial wall, being urged upstream by a spring 56 mounted between the blades 42 and the upstream faces of the radial tabs 50 of the inner platform 36.

Figure 2:
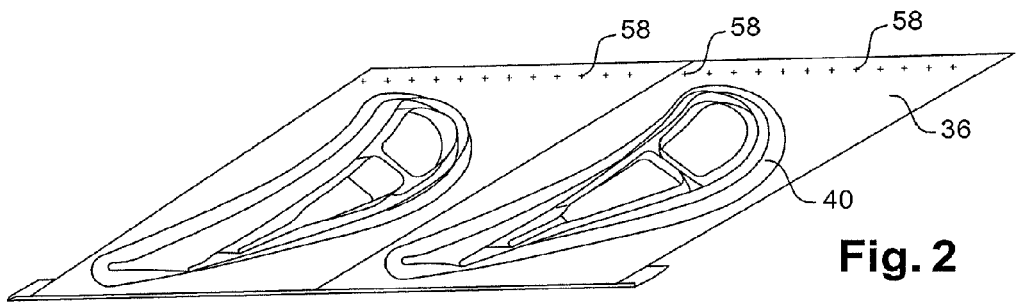
FIG. 2 is a diagrammatic view in perspective from above of two sectorized inner platforms of the FIG. 1 nozzle.

Upstream from the leading edges of the airfoils, each sector of an inner platform 36 has a circumferential row of substantially radial orifices 58 passing through the platform 36 (FIG. 2). These orifices 58 open out into the annular passage defined by the inner and outer platforms 36 and 38. On the side of the inner platform 36 remote from the airfoils 40, these orifices 58 open out axially between the radial wall 48 and the radial tabs 50 of the inner platform 36.

In similar manner, each sector of the outer platform 38 has orifices opening out in the outer face of the platform 36 between a radial wall and radial tabs, and in the inner face of the outer platform 38 upstream from the leading edges of the airfoils 40.

In operation, air (arrows A) flowing around the combustion chamber 10 feeds the orifices 58 in the inner and outer platforms 36 and 38 respectively, thereby enabling the platforms to be cooled. Nevertheless, the air streams passing through the inner and outer platforms 36 and 38 are flowing at a relatively high speed, which leads to a cooling air penetrating a long way into the annular passage, thereby failing to achieve optimum cooling of the platforms of the nozzle.

The invention provides a simple solution to the problems of the prior art by forming a circumferential annular cavity 60 over at least the sectors of the inner and/or outer platform, the orifices 64 of each platform opening out at one end beside the airfoils upstream from the leading edges 63 of the airfoils, and at the opposite end in a closed cavity having cooling air feed orifices.

Figure 3:
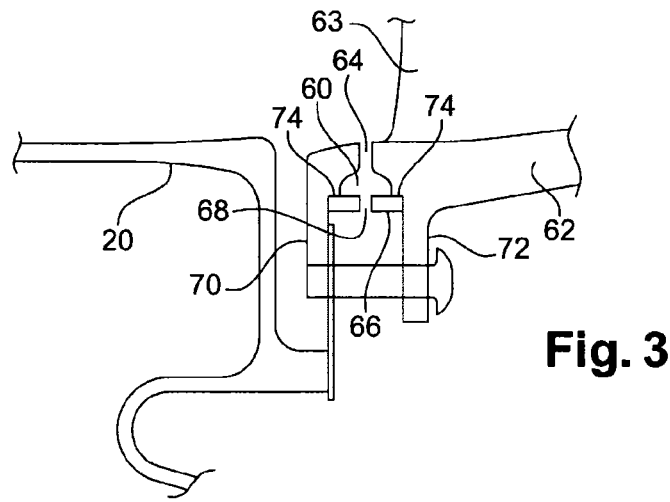
FIG. 3 is a diagrammatic axial section view of the upstream end of an inner platform of a nozzle of a high-pressure turbine of the invention.

FIG. 3 shows the upstream inner end of a nozzle sector of the invention, connected to the downstream end of the outer wall 20 via a seal of the type described above with reference to FIGS. 1 and 1A.

In FIG. 3, the cavity is formed axially between an inner radial wall 70 of the upstream end of the inner platform 62 and inner radial fastener tabs 72 of the sealing means.

This cavity 60 is formed by machining an annular groove in the thickness of each sector of the inner platform 62, and it is closed by a metal sheet 66 that is inserted radially between the radial wall 70 and the radial tabs 72 and that is fastened by brazing or welding to cylindrical bearing surfaces 74 formed upstream and downstream on either side of the inner opening of the groove 60.

Figure 4:
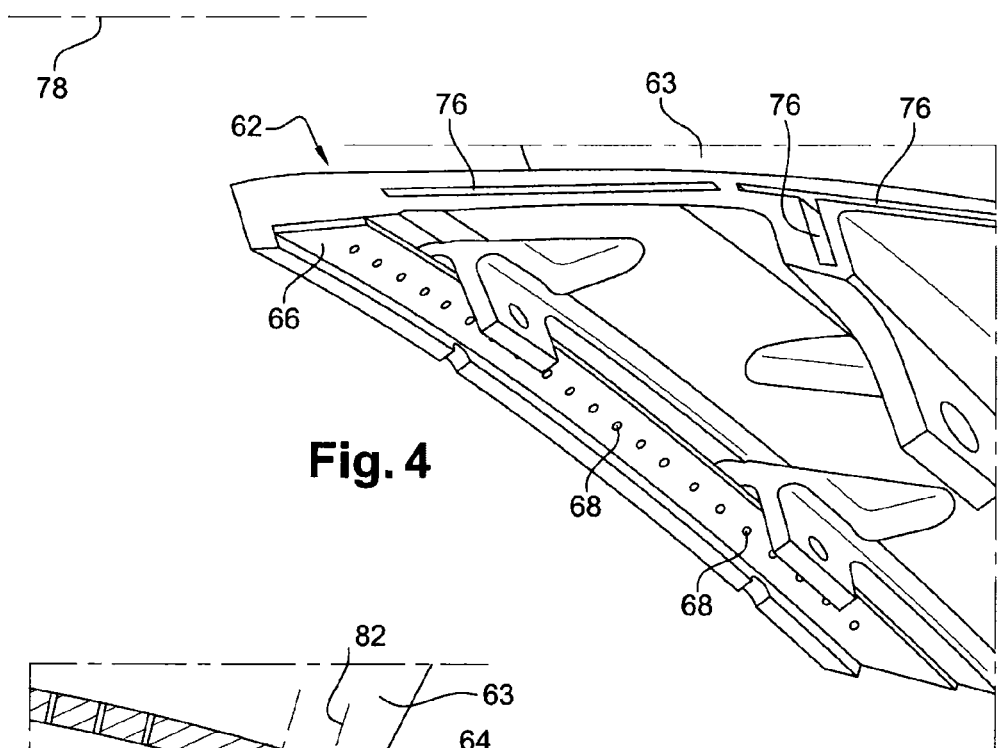
FIG. 4 is a diagrammatic perspective view from the inside of an inner platform of a nozzle of the invention.

The circumferential ends of the groove 60 are closed and do not open out at the circumferential ends of the sector of the platform 62 (FIG. 4). In this way, it is possible to conserve a sealed junction between two facing platform sectors by known means of the type comprising blades each having one half inserted in a slot 76 in a circumferential edge of a platform of a nozzle sector, with the other half inserted in the slot 76 of a facing circumferential edge of a platform of an adjacent nozzle sector.

Each metal sheet 66 extends over the same angular distance as the nozzle sector. The orifices 68, 64 in the sheet 66 and the platform are regularly spaced apart from one another and their respective axes 80, 82 lie in a common plane perpendicular to the longitudinal axis 78 of the nozzle.

Figure 5:
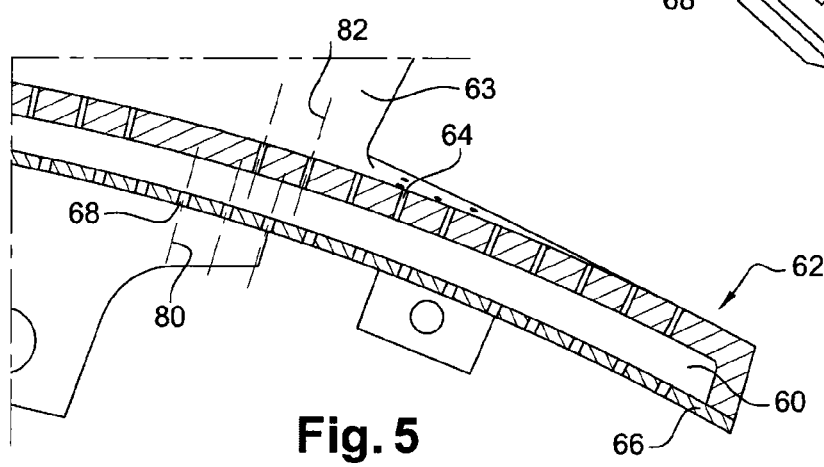
FIG. 5 is a diagrammatic perspective view and a section view on a cross-section plane showing the upstream end of the inner platform of FIG. 4.

As shown in FIG. 5, the axes 80 of the orifices 68 in the sheet 66 are each situated in a plane containing the longitudinal axis 78 of the nozzle and lies substantially between two consecutive orifices 64 of the platform. This staggered arrangement of the orifices 68 in the sheet 66 relative to the orifices 64 in the platform 62 enables the platform 62 to be cooled by air impact.

The number of orifices in the platform 62 of each nozzle sector may be equal to the number of orifices in the sheet 66 of the nozzle sector, and may for example lie in the range 20 to 25.

The orifices 68 in the sheets 66 and the orifices 64 in the platforms 62 of the nozzle sectors may be identical in diameter, e.g. having a diameter of about 0.5 millimeters (mm) to 0.6 mm.

In a particular embodiment of the invention, each sheet 66 may be about 1 mm thick.

The invention is described above with reference to an inner platform 62 of a nozzle. Nevertheless, it applies equally to the outer platforms of nozzle sectors.

It can also be understood that it is possible to form closed circumferential cavities solely in the inner platforms, or else solely in the outer platforms, or indeed in both the inner and the outer annular platforms of the nozzle.

As mentioned above, incorporating a cavity 60 into which the orifices 64 of the platforms 62 open out and that is closed by a sheet 66 pierced by orifices 68, makes it possible to reduce the penetration speed of the fraction of the air that flows around the chamber and that is reintroduced via the orifices in the platforms, thus enabling the air that is reintroduced to flow closer to the faces of the platforms that face the airfoils.

In addition, because the air that has flowed around the chamber and that has been reintroduced into the annular passage presents a speed that is slower than in the prior art, this air becomes mixed less quickly with the hot gas from the combustion chamber, thereby further reducing circumferential temperature non-uniformities and thus achieving better circumferential uniformity in the temperature of the nozzle.

The invention claimed is:

1. A sectorized nozzle for a turbine engine turbine comprising:
    an inner sectorized annular platform and an outer sectorized annular platform connected together by substantially radial airfoils,
    at least one of the platforms including a plurality of through orifices for passing air upstream of a leading edge of the airfoils,
    the through orifices being distributed over the circumference of the platform,
    wherein the through orifices for passing air in each sector of a platform open out upstream from the airfoils into a circumferential annular cavity of the sector of the platform,
    the cavity being closed and further comprising cooling air feed orifices that are offset tangentially in a staggered configuration relative to the through orifices in the platform,
    wherein the cavity is formed by a groove arranged in a thickness of the at least one of the platforms of each nozzle sector and closed by a metal sheet including the cooling air feed orifices,
    wherein the cavity is disposed downstream of a radial wall of the at least one of the platforms, and a sealing device is fastened to the radial wall, and
    wherein the metal sheet being inserted radially between the radial wall and a radial tab of the sealing device.

2. A nozzle according to claim 1, wherein axes of the through orifices and cooling air feed orifices in the platform and in the annular cavity of each nozzle sector lie substantially in a common plane perpendicular to a longitudinal axis of the nozzle.

3. A nozzle according to claim 1, wherein the through orifices in the platform and in the annular cavity of each nozzle sector are regularly spaced apart from one another.

4. A nozzle according to claim 1, wherein a number of orifices in the platform of each nozzle sector is equal to a number of orifices in the annular cavity of the nozzle sector.

5. A nozzle according to claim 1, wherein the through orifices in the platform of each nozzle sector are of a diameter substantially identical to a diameter of the cooling air feed orifices in the cavity of the sector.

6. A nozzle according to claim 1, wherein the metal sheet is fastened by brazing or welding on two cylindrical bearing surfaces of the platform of each nozzle sector, which surfaces are situated respectively upstream and downstream relative to the cavity.

7. A turbine engine, or an airplane turboprop or turbojet, comprising a turbine nozzle according to claim 1, arranged at an outlet from an annular combustion chamber.

\* \* \* \* \*